Figure 1:
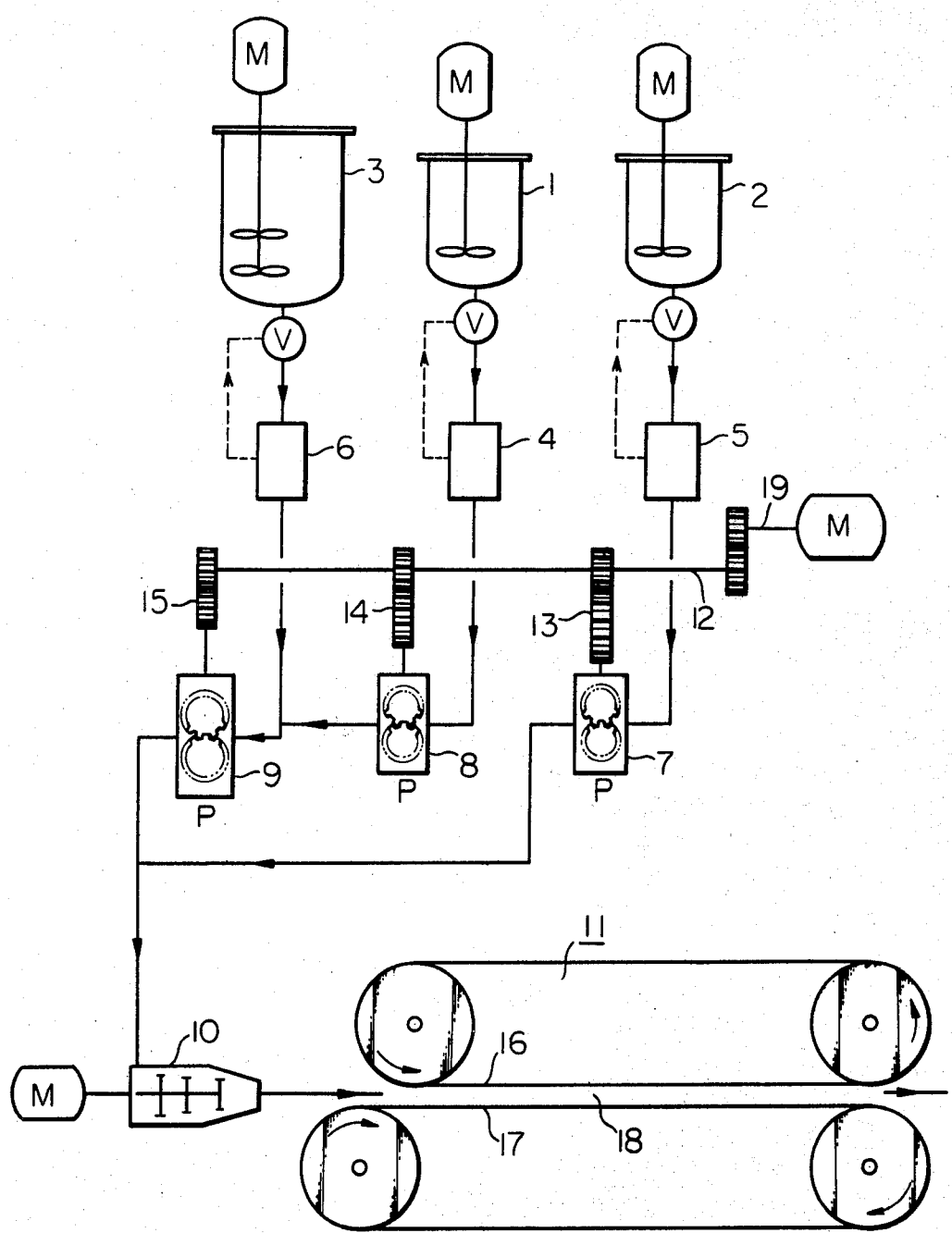

United States Patent [19] [11] 3,999,686
Kato [45] Dec. 28, 1976

[54] APPARATUS FOR CONTINUOUSLY MIXING AND MONITORING A SYRUP MIXTURE

[75] Inventor: Tetsuji Kato, Otake, Japan

[73] Assignee: Mitsubishi Rayon Co., Ltd., Tokyo, Japan

[22] Filed: Oct. 30, 1975

[21] Appl. No.: 627,360

Related U.S. Application Data

[62] Division of Ser. No. 541,111, Jan. 15, 1975, which is a division of Ser. No. 434,064, Jan. 17, 1974, Pat. No. 3,966,693.

[30] Foreign Application Priority Data

Jan. 18, 1973 Japan .............................. 48-8161
Jan. 18, 1973 Japan .............................. 48-8167

[52] U.S. Cl. .................. 222/39; 222/40; 222/71; 222/135
[51] Int. Cl.² ...................... B67D 5/32; B67D 5/34
[58] Field of Search .......... 137/391; 425/146, 145; 222/71, 255, 39, 40, 135, 145; 73/223

[56] References Cited

UNITED STATES PATENTS 2,697,939  12/1954  Martin et al. .................... 73/223 X
3,000,207  9/1961  Groffe ............................ 73/223 X
3,081,909  3/1963  Hooker .......................... 222/255 X Primary Examiner—Robert B. Reeves
Assistant Examiner—David A. Scherbel
Attorney, Agent, or Firm—Kenyon & Kenyon et al.

[57] ABSTRACT

A continuous mixing method and system for preparation of syrup employed as a starting material for continuously manufacturing plate products therefrom are disclosed. The syrup is prepared by a method in which at least one additive is incorporated into at least one master batch of methyl methacrylate or a monomer mixture of methyl methacrylate and a copolymerizable unsaturated compound or a syrup of a monomer-polymer mixture thereof and the flow of the resulting liquid mixture is continuously combined with the flow from another batch of a syrup of the monomer-polymer mixture in a proportion such that the master batch is less in amount than said other batch, and the combined flows are continuously blended with each other. In the mixing system, the fluctuation in the flow from the master batch is detected by a detecting means which is operable for actuating the closure of the valve means provided for the storage vessel for the master batch, upon detection of the fluctuation in the flow rate from the master batch. Also, metering pumps are provided in the system, each being associated with each of the vessels for the master batch and the other batch for discharging the liquid content of each vessel at each fixed displacement ratio. The metering pumps are driven by a common motor via respective gear engagements having respective gear ratios for determining the fixed displacement ratios of the pumps. A mixer is also provided in the system for continuously blending the respective liquid contents to continuously obtain the starting material.

2 Claims, 2 Drawing Figures

APPARATUS FOR CONTINUOUSLY MIXING AND MONITORING A SYRUP MIXTURE

This is a division of application Ser. No. 541,111 filed Jan. 15, 1975 which is a divison of Ser. No. 434,064 filed Jan. 17, 1974, now U.S. Pat. No. 3,966,693.

The present invention relates to a method of and apparatus for continously preparing a syrup of a monomer-polymer mixture which syrup contains a polymerization initiator and, if required, other additives incorporated therein and which is employed as a starting material for continuously manufacturing plates therefrom by introducing said syrup from one end of a space defined by confronting surfaces of two endless belts running in a face-to-face relationship with a certain distance therebetween, and by gaskets running in compliance with said belts and gripped between said belts and by withdrawing a polymer in the form of a plate from the other end of said space.

The syrup of a monomer-polymer mixture used herein, refers to a partial polymerization product or a blend of methyl methacrylate or a mixture of methyl methacrylate and at least one other copolymerizable unsaturated compound, and hereinafter referred to as "syrup", for brevity's sake. A syrup which contains a polymerization initiator and, if required, other additives such as colorants and releasing agents, incorporated therein in a stated porportion and is readily capable of being employed as a starting material for manufacturing plates as set forth above, is hereinafter referred to as "prepared syrup", for brevity's sake.

The preparation of cast plates of methyl methacrylate polymer resins has heretofore been mainly performed by a so-called glass cell cast method wherein a batch of prepared syrup was introduced into a cell composed of two confronting sheets of tempered or non-tempered glass, and the prepared syrup was heated to effect polymerization. In a factory wherein this method is carried out, several kinds of glasses sheets differing in size are generally used to obtain plate products differing in thickness, size and color tone. Accordingly, this method is not suitable for mass-production of plate products which are all of the same size. If cast plates are prepared according to this method, the number of sheets produced from each batch of prepared syrup is small, and therefore the syrup preparation can be sufficiently accomplished by a batchwise method comprising introducing at one time a polymerization initiator and other additives into the syrup in a suitable mixing vessel and blending them under agitation. If a large quantity of syrup should need to be prepared using the above batchwise method for syrup preparation, it is necessary either to increase the frequency of syrup preparation, or alternatively, it is necessary to increase the size of the batches of prepared syrup. However, problems arise as, in the former case, there is an increase in the labor required and also in the accompanying increase of operational mistakes whereas, in the latter case, the equipment cost is greatly increased. These problems present difficulties in the designing of plants.

In contrast, the process of continuously manufacturing cast plates of methyl methacrylate polymer resins has as its essential object the mass-production of plate products of limited kinds, and this implies that the preparation of a syrup to be employed in such a continuous process must be conducted by a method meeting this object.

It has now been found that the above-mentioned problems can be completely solved and the continuous preparation of prepared syrup can be advantageously performed by adopting a method wherein a polymerization initiator and, if required, other additives, are incorporated into at least one master batch of a syrup or methyl methacrylate monomer, and the flow of the resulting mixture is continuously combined with the flow from another batch of a syrup in a proportion such that said master batch is less in amount than said another batch, and the combined flows are continuously blended with each other. By the term "methyl methacrylate monomer" used herein is meant methyl methacrylate or a mixture of methyl methacrylate and a copolymerizable unsaturated compound. Hereinafter this term is often referred to as "monomer" for brevity. The mixture comprises a predominant amount, usually 80% by weight or more, of methyl methacrylate and a minor amount, usually 20% by weight or less, of a copolymerizable unsaturated compound.

The copolymerizable unsaturated monomer includes, for example, monoethylenically unsaturated compounds such as methyl acrylate, ethyl acrylate, ethyl methacrylate, acrylic acid, styrene, α-methylstyrene, acrylonitrile and vinyl acetate, and polyfunctional compounds such as glycol dimethacrylate, diallyl methacrylate, diallyl phthalate and diethylene glycol bisallyl-carbonate.

According to the present invention, a method of continuously preparing a syrup of a monomer-polymer mixture of methyl methacrylate or a monomeric mixture of methyl methacrylate and a copolymerizable unsaturated compound is provided which syrup contains at least one additive incorporated therein and is employed as a starting material for continuously manufacturing plates therefrom by introducing said syrup into one end of a space defined by confronting surfaces of two endless belts running in a face-to-face relationship with a certain distance therebetween and by gaskets running in compliance with said belts and gripped between said belts and by withdrawing a polymer in the form of a plate from the other end of said space, said method being characterized in that at least one additive is incorporated into at least one master batch of methyl methacrylate or said monomer mixture or the syrup of the monomer-polymer mixture, and the flow of the resulting liquid mixture is continuously combined with the flow from another batch of a syrup of the monomer-polymer mixture in a proportion such that said master batch is less in amount than said another batch and the combined flows are continuously blended with each other.

Further, according to the present invention, a system for continuously preparing a syrup of a monomer-polymer mixture of methyl methacrylate or a monomer mixture of methyl methacrylate and a copolymerizable unsaturated compound is provided, which syrup contains at least one syrup of an additive incorporated therein and is employed as a starting material for continuously manufacturing plates therefrom by introducing said syrup into one end of a spaced defined by confronting surfaces of two endless belts running in a face-to-face relationship with a certain distance therebetween and by gaskets running in compliance with said belts and gripped between said belts and subsequently withdrawing a polymer in the form of a plate from the other end of said space, the system comprising:

at least first and second liquid storage vessels, the first for containing a batch of syrup of the monomer-polymer mixture and the second for containing a master batch of methyl methacrylate or said monomer mixture or a syrup of the monomer-polymer mixture having at least one additive incorporated therein;

at least one detecting means for detecting the fluctuation in the liquid flow rate, said detecting means being connected to a valve means associated with said second vessel and for actuating the closure of said valve means upon detection of the fluctuation in the flow rate from said master batch at least two metering pumps, each being associated with each of said first and second vessels for discharging the liquid content of each said vessel at each fixed displacement ratio, said two pumps being driven by a common motor via respective gear engagements having respective gear ratios for determining said fixed displacement ratios of said pumps, and;

a mixer for blending said liquid contents discharged by respective said metering pumps, said mixer being associated with said space formed by said confronting endless belts for feeding the blended syrups into said space.

The method of the syrup preparation according to this invention is advantageous in the following respects.

1. The operation of the syrup preparation can be greatly simplified. This makes it possible to save labor.

For instance, if a master batch of the monomer or syrup containing additive incorporated therein is mixed with another syrup at a mixing ratio of one part of said master batch to 9 parts of the batch, 10 parts of the prepared syrup is obtainable from one part of said master batch. Accordingly, the operation of syrup preparation can be greatly simplified, as compared to the conventional batchwise method for said syrup preparation. Thus labor is saved at the syrup preparation step.

2. The continuous syrup preparation facilitates the inspection of the mixing state of the additive containing monomer or syrup mixed with another syrup.

It is possible to ascertain whether a desired prepared syrup is being prepared or not, simply by measuring electrically or mechanically the rates of consumption of the additive containing monomer or syrup and of another syrup. This is important in preparing the prepared syrup to be fed to an apparatus for the continuous preparation of cast plates. More specifically, if a prescribed amount of the polymerization initiator is not present in the prepared syrup, foaming occurs in the apparatus for the continuous preparation of plates. This is undesirable because foamed plates cannot be released from the upper and lower steel belts of the apparatus without leaving fatal flaws on said steel belts. In practice, this problem is so serious that it is not possible to build a factory for the manufacture of cast plates by a continuous process. In view of the foregoing, it is of significance that the mixing state of the additive containing monomer or syrup mixed with another syrup can easily be detected.

In conventional batchwise methods of syrup preparation, it is necessary to confirm the suitability for polymerization of each batch of the prepared syrup, and the frequency of tests for confirmation of polymerization suitability is consequently much greater than in the continuous mixing method according to the present invention. Accordingly, the conventional batchwise method inevitably involves complicated and troublesome operational procedures. With the conventional batchwise method, in order to reduce the frequency of tests for confirmation of polymerization suitability, it is necessary to increase the unit amount of one batch of the prepared syrup, which results inevitably in the increase of the capacity of the vessel in which the syrup preparation is carried out. This disadvantage becomes greater as the scale of the factory becomes larger, and various difficulties occur in the actual construction of a factory and the actual operation of the apparatus.

3. Continuous cast plates of good homogeneity and quality can be manufactured with high reliability.

This effect is easily seen with respect to the color tone of continuous cast sheets. When the syrup prepared according to the conventional batchwise method is employed, the color tone of the cast plate varies greatly between different batches of said prepared syrup. In contrast, when the prepared syrup formed by the continuous mixing method using an additive-containing monomer or syrup is employed, the range of fluctuation of the color tone is extremely narrow, and hence, sheets uniform in color tone can be obtained.

4. Switching over from one kind of product to another can easily be accomplished.

The continuous mixing method for the syrup preparation includes an embodiment in which two or more batches of monomer or a syrup each containing an additive are prepared, one comprising additives used commonly in all kinds of plate products and the other comprising additives, such as dyes and pigments, the composition of which differs among different kinds of plate products, and these monomers or syrups are continuously mixed with another batch of the syrup at appropriate ratios. According to this embodiment, the switch-over from one kind of product to another can easily be accomplished by substituting a monomer or syrup containing a dye or pigment of a certain color tone for a monomer or syrup containing a dye or pigment of another color tone.

Loss of the prepared syrup occurs due to the inevitable mingling, in one pipe, of one prepared syrup for a product prepared first, with another prepared syrup for a product prepared subsequently, but the apparatus for continuous mixing according to this invention can be so arranged that this loss will be equivalent to the minimum loss of the prepared syrup occuring due to the inevitable mingling, in the casting space of the apparatus used for the continuous preparation of plates, of one prepared syrup with another. This is caused when the switchover of product kinds is conducted in the apparatus. This means that a great advantage is attained by the method of syrup preparation according to the present invention. More specifically, with an apparatus for the continuous preparation of plates, substitution of devices for feeding the prepared syrup into the casting space of the apparatus cannot easily be performed when switching over from one kind of product to another, and therefore, it is a great technical advantage that the switching over can easily be accomplished without the substitution of feeding devices.

The continuous mixing method and apparatus for syrup preparation according to the present invention will now be described by way of an example and by reference to the accompanying drawing.

Figure 2:
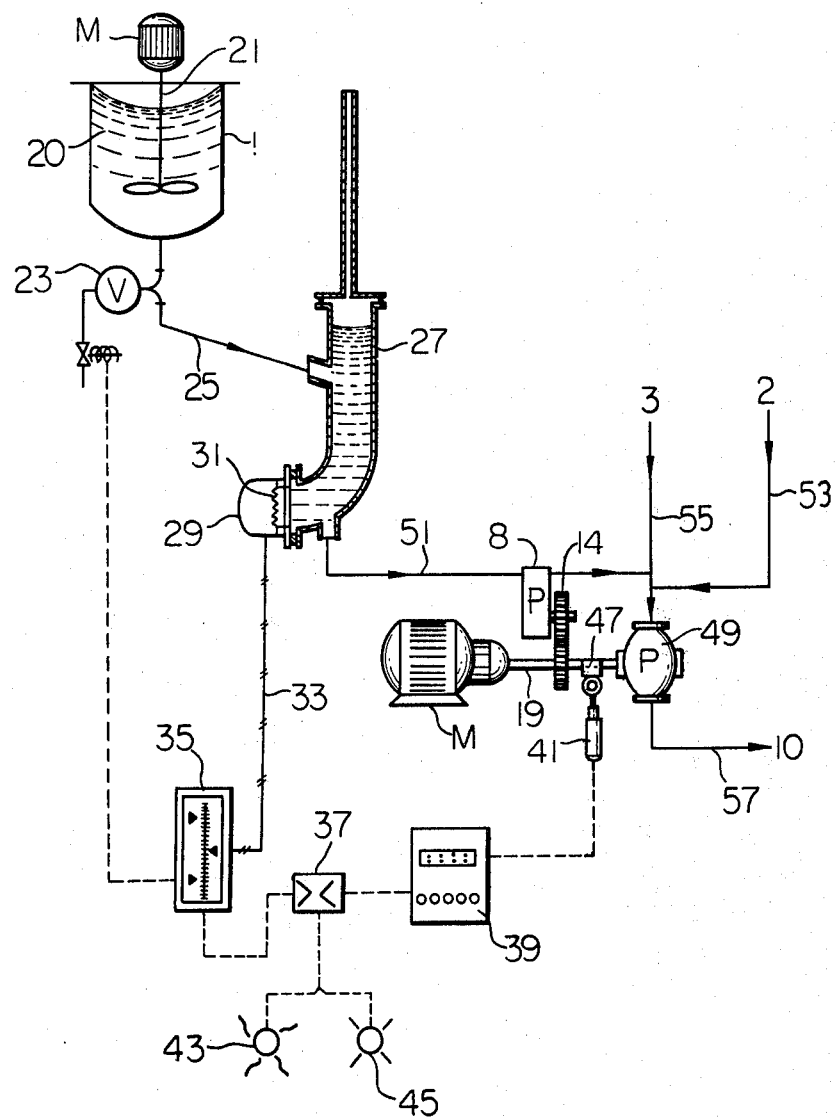

FIG. 1 is a flow sheet of a typical system for carrying out the method for continuously preparing a prepared syrup according to the present invention, and FIG. 2 illustrates details of one preferred arrangement of a detector for detecting a fluctuation in the flow rate, which is shown with numeral references 4, 5 or 6 in FIG. 1.

In FIG. 1, a vessel 1 is a tank wherein a master batch is prepared by mixing the monomer or syrup with additives commonly used for the preparation of all kinds of plate products. It will be understood that the polymerization initiator is generally incorporated in this vessel. A vessel 2 is a tank wherein another master batch is prepared by mixing the monomer or syrup with other additives. A vessel 3 is a storage reservoir for another batch of the syrup. Each of the vessels 1, 2 and 3 is provided with a stirrer driven by a motor shown with reference M.

Detectors 4 and 5 are disposed to detect the fluctuation in the flow rates of the monomers or syrups flowing from the vessels 1 and 2, respectively, and detector 6 is disposed to detect the fluctuation in the flow rate of the syrup from vessel 1. The two monomers or syrups containing additives incorporated therein withdrawn from the vessels 1 and 2 and the syrup withdrawn from the reservoir 3, are combined in one pipe at a prescribed ratio by means of pumps 7, 8 and 9, respectively. The vessel 3 has a capacity larger than those of vessels 1 and 2. The combined liquid is continuously blended by means of a mixer 10. The liquid coming from this mixer is prepared syrup. This prepared syrup is forwarded to the succeeding course of casting plates, namely an apparatus 11 for the continuous preparation of plates. The prepared syrup is introduced from one end of a space 18 defined by confronting surfaces of two endless belts 16 and 17 running in a face-to-face relationship with distance corresponding to the thickness of the resulting plate product and by gaskets (not shown in FIG. 1) running in compliance with the endless belts 16 and 17 and gripped between said endless belts 16 and 17.

It is preferable that each of pumps 7, 8 and 9 is a metering pump such as a gear pump having a fixed displacement. In the embodiment shown in FIG. 1 these pumps are so disposed that they can be driven by means of a coaxial drive shaft 12. The flow rates of these pumps are so controlled by fixing gears 13, 14 and 15 to these pumps that the mixing ratio of the two additive-containing monomers or syrups and another syrup can be kept constant. Accordingly, even if the speed or rotation of the shaft 12 should vary, the ratio of the flow rates of these pumps 7, 8 and 9 can be kept constant. Of course, this ratio can optionally be changed depending on the intended products to be manufactured by exchanging gear 13, 14 or 15 which is meshed with the corresponding pinion on the shaft 12, with another gear having a different tooth number, since the displacement of each pump 7, 8 or 9 depends on the gear ratio between said pinion and said gear 13, 14 or 15.

It is possible to increase the number of different kinds of monomers or syrups into which additives are incorporated, if required. The operation of changing over from one master batch to another can be smoothly accomplished by providing a corresponding number of accessory members such as detectors, pumps and gears.

Detector 4, for detecting the fluctuation in the flow rate of the liquid of the monomer or syrup will now be described in detail with reference to FIG. 2 which schematically illustrates the entire arrangement for detecting the fluctuation in the flow rate of the monomer or syrup flowing from the vessel 1 of FIG. 2. The arrangements of the other detectors 5 or 6 for detecting the fluctuation in the flow rates of liquids flowing from the vessels 2 and 3 are equivalent to that of detector 4.

Before beginning said description of FIG. 2, it should be understood that in the detection of the flow rate of a polymerizable liquid material, such as a monomer or a syrup of a monomer-polymer mixture, when employing a detector in which a movable element or a movable mechanism is disposed in a portion being wetted by the liquid material complete substitution of the liquid having previously flowed into the detector for the freshly flowing liquid cannot be realized in the clearances of a seal for a shaft member, in bent parts or in places where the liquid material flow velocity or liquid pressure varies, and as a result, stagnancy of the liquid material takes place in such clearances whereby polymerization of the liquid material being stagnant, serious trouble, such as obstruction or damage to the detector, occurs.

In accordance with the arrangement of the detector, the above-mentioned stagnancy of the liquid material passing through the detector is completely eliminated. Further, there are no movable elements positioned in any portion of the detector which is wetted by the passing liquid material, and alarm contacts which operate to generate warning signals, are disposed in the exterior separated from the flow line of the liquid material.

Referring to FIG. 2, in vessel 1, a monomer or syrup 20 is stored and stirring of the monomer or syrup 20 is carried out by a stirrer 21 driven by a motor M. This monomer or syrup 20 is fed through an automatically operated valve 23 such as an electro-magnetic valve, and a conduit 25 to a metering tube 27 made of e.g. stainless steel tubes having a small curved portion at one end thereof, and charged in the metering tube 27. The liquid level of the charged monomer or syrup 20 is detected by a diaphragm type differential level meter 29 having a diaphragm 31 and attached to the bottom end of the metering tube 27 by means of the flange connection. The detected level information is sent to a liquid level setting device 35, such as a pneumatic pressure sensitive indicator, via a pneumatic pressure line 33. When the liquid level of the monomer or syrup 20 reaches an upper limit which is preliminarily set in the setting device 35, the automatically operated valve 23 is closed by a command signal from the setting device 35, and the supply of the monomer or syrup to the metering tube 27 is stopped. Said monomer or syrup 20 in the tube 27 is withdrawn from the bottom outlet of the tube 27 via conduit 51 by means of a metering pump 8 and forwarded, together with other monomer and syrup, or syrups withdrawn from the other vessels 2 and 3 via conduits 53 and 55, respectively, to the suction side of a metering pump 49 for feeding said collected monomer or syrup. Since the monomer or syrups have a relatively low viscosity, when the steps subsequent to a conduit 57 are operated under elevated or reduced pressure, the accuracy of the metering of the pump 8 is adversely affected if the syrups are directly fed into conduit 57. Therefore, it is advantageous that the conduit of said syrups is connected to the suction side of the pump 49 in which the liquid pressure is kept substantially constant. It should be noted here that the system of FIG. 1 shows a case where the pump 49 is eliminated, since the steps after metering pumps 7, 8 and 9 are operated under neither elevated pressure nor reduced pressure. Pumps 8 and 49 of FIG. 2 are driven by means of a motor M provided with a stepless reduction mechanism through a single drive shaft.

The metering pumps 8 and 49 must be of a fixed displacement pump kind. On the shaft 19, is fixedly mounted a cam element 47 which associates with and actuates a counter 41 provided for counting the number of the rotations of the metering pump 8 and for generating each counted signal which is transmitted to a presetting counter 39, such as a commercially available electronic counter. The presetting counter 39 is used for presetting the number of the rotations of the pump 8 which number is necessary for discharging the monomer or syrup 20 to reduce the liquid level in the metering tube 27 from the upper limit to the lower limit, and the number $\alpha$ must be present, in addition, in a case where the pump 8 is a rotary type pump. In a case where the pump 8 is a reciprocatory type, the overall reciprocating movement frequency of the pump 8, which frequency is necessary for discharging the monomer or syrup 20 to reduce the liquid level in the metering tube 27 from the upper limit to the lower limit, and in addition, the frequency $\alpha$ are preset in the counter 39. The value $\alpha$ is preferably chosen from a value between two and five by the operator. When the liquid level of the monomer or syrup 20 in the metering tube 27 reaches the lower limit, the valve 23, is opened by a command signal from the setting device 35, so that the monomer or syrup 20 is freshly fed from the vessel 1 into the tube 27. On the other hand, the valve 23 is closed when the liquid level in the metering tube 27 reaches the upper limit. By repeating the above procedures, the monomer or syrup 20 in the vessel 1 is continuously fed out through the detector of the present invention so as to join the other monomer or syrup from the vessels 2 and 3.

During the normal operation of the arrangement of FIG. 2, when the counter 39 has counted the aforementioned necessary number of frequency and subsequently while it is counting the number or frequency $\alpha$, the liquid level in the metering tube 27 reaches the lower limit. The valve 23 is then opened by a command signal from the setting device 35 so that the monomer or syrup 20 is again fed into the metering tube 27, and simultaneously the counter 39 is reset by a signal coming from the setting device 35. When the counter 39 has completed the counting of the above necessary number or frequency of the rotations or the reciprocations of the pump 8 and the additional number or frequency $\alpha$, and if the liquid level in the metering tube 27 has still not reached the lower limit, an alarm indicating lamp 43 as well as alarm buzzer 45 are actuated by a comparator 37 which is provided between setting device 35 and presetting counter 39, so that warning signals are given to the operator. In this connection, it will be noted that if the operator chooses zero for the value $\alpha$ warning signals are always given when the liquid level in the tube 27 reaches the lower limit.

In the arrangement of FIG. 2, it is shown that the syrups in the conduit 57 are fed to the mixer 10 of FIG. 2. However, it is, of course, possible to provide a suitable filtering device, a deaerating device and a feeding means for feeding the mixed syrup to the apparatus 11 for the continuous preparation of plate products, on the way from the detector of the present invention to the apparatus 11.

EXAMPLE

The pumps 7, 8 and 9, and gears 13, 14 and 15 were so adjusted that the ratio of the flow rates of a polymerization initiator-containing monomer, a dye or pigment-containing syrup and a syrup, withdrawn from vessels 1, 2 and 3, respectively, was 5 : 10 : 85.

| | |
|---|---|
| A. Polymerization Initiator-Containing Monomer: | |
| Composition (% by weight); | |
| Methyl methacrylate monomer | 97.4% |
| Polymerization initiator *1 | 1.2% |
| Stabilizer | 1.0% |
| Ultraviolet observer | 0.2% |
| Releasing agent | 0.2% |
| *1 azobisisobutyronitrile | |
| Viscosity of syrup A: 0.5 cp | |
| B. Dye or Pigment-Containing Syrup: | |
| Composition (% by weight): | |
| Syrup *2 | 95.0% |
| Titanium dioxide | 5.0% |
| *2 Syrup diluted with methyl | |
| methacrylate monomer was employed | |
| Viscosity of Syrup B: 200 cp | |
| C. Syrup: | |
| Viscosity of Syrup C: 1700 cp | |

A prepared syrup was obtained by passing the three syrups, A, B and C through a system and an arrangement of the types shown in FIGS. 1 and 2. The quantities of the additives in the prepared syrup which were obtained by analysis and the physical properties of the prepared syrup are as follows:

| | |
|---|---|
| Polymerization initiator | 620 ppm |
| Stabilizer | 510 ppm |
| Ultraviolet absorber | 105 ppm |
| Releasing agent | 110 ppm |
| Titanium dioxide | 1.05% |
| Viscosity of prepared syrup | 900 cp |

In order to estimate the polymerization performance of the prepared syrup, the preparation of a plate of four millimeters thickness was carried out in a hot water bath maintained at 95° C. The results are as follows:

| | |
|---|---|
| Time required for hardening. | 17.8 minutes |
| Intrinsic viscosity of resulting plate (determined at a concentration of 1 g/l in chloroform at 25° C) | 0.193 |

The prepared syrup was found to be the same in the polymerization performance as the syrup prepared in a batchwise manner.

Further, a white plate made by feeding the prepared syrup into the apparatus 11 for the continuous preparation of plates was of attractive appearance and improved whiteness as compared with a plate made from the prepared syrup formed in the batchwise manner.

What is claimed is:

1. An apparatus for detecting fluctuation in the flow rate of a liquid within a liquid passageway comprising:
   a metering tube disposed in the liquid passageway and associated with a liquid level metering means for setting a first and a second liquid level limits of the liquid supplied into the metering tube via an automatically operated valve, said setting means closing the valve when the liquid within the metering tube reaches the first liquid level limit and opening the valve when the liquid within the metering tube reaches the second liquid level limit;

a pumping means adapted for discharging the liquid from the metering tube at a fixed displacement rate for each pumping cycle;

a setting means for setting therein the number of pumping cycles necessary for discharging the liquid in the metering tube from the first to the second liquid level limit;

a counter device associated with the pumping means and the setting means for counting the number of the pumping cycles of the pumping means and for generating a signal to be transmitted to reset said setting means upon completion of counting the number of pumping cycles necessary for discharging the liquid in the metering means from the first to the second liquid level limit, and;

means associated with the liquid level metering means and the setting means for generating a warning signal in the case where the time of the liquid level within said metering tube reaching to the second liquid level limit is different from the time of said setting means being reset.

2. An apparatus as set forth in claim 1, wherein said liquid level metering means comprise a hydraulic pressure sensitive device disposed at the bottom of said metering tube for emitting a pneumatic pressure signal indicative of the liquid level in said metering tube, and a pneumatic pressure sensitive setting device having two stationary setting points and a movable setting point moved by said pneumatic pressure signal of the hydraulic pressure sensitive device between said two stationary setting points, said two stationary setting points corresponding to said first and second liquid level limits in said metering tube whereby when said movable point contacts each said stationary setting point, a signal commanding the closing or the opening of said valve is emitted from said setting device.

* * * * *

UNITED STATES PATENT AND TRADEMARK OFFICE
CERTIFICATE OF CORRECTION

PATENT NO. : 3,999,686
DATED : December 28, 1976
INVENTOR(S) : Tetsuji Kato

It is certified that error appears in the above—identified patent and that said Letters Patent are hereby corrected as shown below:

Col. 1, line 8, correct spelling of "continuously".

Col. 2, lines 35-36, correct spelling of "manufacturing".

Col. 2, line 61, change "spaced" to --space--.

Col. 3, line 2, before "syrup" insert --a--.

Col. 5, line 37, after "with" insert --a--.

Col. 7, line 44, change "of" to --or--.

Col. 8, line 6, Chart No. 1, change "observer" to --absorber--.

Signed and Sealed this

Tenth Day of May 1977

[SEAL]

Attest:

RUTH C. MASON
Attesting Officer

C. MARSHALL DANN
Commissioner of Patents and Trademarks